(12) United States Patent
Yang et al.

(10) Patent No.: US 9,342,991 B2
(45) Date of Patent: May 17, 2016

(54) SYSTEMS AND METHODS FOR GENERATING A HIGH-LEVEL VISUAL VOCABULARY

(71) Applicant: CANON KABUSHIKI KAISHA, Tokyo (JP)

(72) Inventors: Yang Yang, Winter Springs, FL (US); Bradley Scott Denney, Irvine, CA (US); Juwei Lu, Irvine, CA (US); Dariusz Dusberger, Irvine, CA (US); Hung Khei Huang, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 577 days.

(21) Appl. No.: 13/830,247

(22) Filed: Mar. 14, 2013

(65) Prior Publication Data

US 2014/0272822 A1 Sep. 18, 2014

(51) Int. Cl.
G06K 9/00 (2006.01)
G09B 5/02 (2006.01)
G09B 19/00 (2006.01)

(52) U.S. Cl.
CPC . *G09B 5/02* (2013.01); *G09B 19/00* (2013.01)

(58) Field of Classification Search
USPC ......................................................... 382/187
See application file for complete search history.

(56) References Cited

U.S. PATENT DOCUMENTS

| | | | | |
|---|---|---|---|---|
| 5,828,999 A * | 10/1998 | Bellegarda | ............. | G06K 9/726 704/231 |
| 7,961,957 B2 | 6/2011 | Schclar | | |
| 2003/0177000 A1 * | 9/2003 | Mao | .................... | G06F 17/2715 704/9 |
| 2005/0044487 A1 * | 2/2005 | Bellegarda | ........... | G06K 9/6219 715/229 |
| 2007/0214172 A1 * | 9/2007 | Nister | .................. | G06K 9/6282 |
| 2012/0076401 A1 * | 3/2012 | Sanchez | .............. | G06K 9/4676 382/159 |
| 2012/0150532 A1 * | 6/2012 | Mirowski | ................ | G06F 17/28 704/9 |
| 2013/0204885 A1 * | 8/2013 | Clinchant | ............ | G06K 9/4676 707/756 |
| 2014/0363075 A1 * | 12/2014 | Li | ..................... | G06F 17/30274 382/159 |

OTHER PUBLICATIONS

G. J. Burghouts et al., Performance evaluation of local colour invariants, Computer Vision Image Understanding, 113:48-62, 2009.
D.G. Lowe, Distinctive image features from scale-invariant keypoints, Int. J.Comput. vision60(2), 91-110 (2004).
R.R. Coifman et al., Diffusion maps, Applied and Computational Harmonic Analysis, 21:5-23, 2006.
S. Lafon et al., Diffusion maps and coarse-graining: a unified framework for dimensionality reduction, graph partitioning, and data set parameterization, PAMI, 28:1393-1430, 2006.
Q.V. Le et al., Learning Hierarchical spatio-temporal Features for Action Recognition with Independent Subspace Analysis, CVPR 2011.
R. Fergus et al., Semi-supervised Learning in Gigantic Image Collections, Advances in Neural Information Processing Systems, 2009.
J. Vogel et al., Natural scene retrieval based on a semantic modeling step, CIVR 2004.

(Continued)

*Primary Examiner* — John Strege
(74) *Attorney, Agent, or Firm* — Canon U.S.A., Inc. IP Division

(57) ABSTRACT

Systems and methods for learning a high-level visual vocabulary generate inter-visual-word relationships between a plurality of visual words based on visual word-label relationships, map the visual words to a vector space based on the inter-visual word relationships, and generate high-level visual words in the vector space.

13 Claims, 12 Drawing Sheets

(56) References Cited

OTHER PUBLICATIONS

L. Yang et al, Unifying discriminative visual codebook generation with classifier training for object category reorganization, CVPR 2008.
B. Fulkerson et al, Localizing objects with smart dictionaries, ECCV 2008.
W. H. Hsu et al., Visual cue cluster construction via information bottleneck principle and kernel density estimation, CIVR 2005.
J. Winn et al, Object categorization by learned universal visual dictionary, ICCV 2005.
A. Bosch et al, Scene classification via pLSA, ECCV 2006.
L. Fei-Fei et al., A Bayesian hierarchical model for learning natural scene categories, CVPR 2005.
Laurens van der Maaten et al., Visualizing Non-Metric Similarities in Multiple Maps, Machine Learning 87(1):33-35, 2012.
Jiawei Han, Mining Heterogeneous Information Networks: The Next Frontier, University of Illinois at Urbana-Champaign, Aug. 2012.
Stéphane Lafon et al., Data Fusion and Multi-Cue Data Matching by Diffusion Maps, IEEE Trans. Pattern Anal. Mach. Intell., vol. 28 (2006), pp. 1784-1797.
Jingen Liu et al., Learning Semantic Features for Action Recognition via Diffusion Map, Computer Vision and Image Understanding, vol. 116, Issue 3, Mar. 2012.
Jingen Liu et al., Learning Semantic Visual Vocabularies Using Diffusion Distance, IEEE International Conference on Computer Vision and Pattern Recognition(CVPR), Miami, 2009.
Jingen Liu et al., Learning Semantic Vocabularies using Diffusion Distance Project page, downloaded from http://www.cs.ucf.edu/~liujg/dm.html, Oct. 11, 2012.
Boaz Nadler et al., Diffusion Maps—a Probabilistic Interpretation for Spectral Embedding and Clustering Algorithms, Lecture Notes in Computational Science and Engineering 2007, vol. 58, pp. 238-260.
Boaz Nadler et al., Diffusion Maps, Spectral Clustering and Eigenfunctions of Fokker-Planck Operators, Advances in Neural Information Processing Systems, No. 18, pp. 955-962, 2005.
Boaz Nadler et al., Diffusion Maps, Spectral Clustering and Reaction Coordinates of Dynamical Systems, Appl. Comput. Harmon. Anal. 21 (2006) 113-127.
Oana Sidi et al., Unsupervised co-segmentation of a set of shapes via descriptor-space spectral clustering, ACM Transactions on Graphics (TOG), vol. 30 Issue 6, Dec. 2011.
Andreas Opelt et al., "Generic Object Recognition with Boosting", PAMI, 2004.
Andreas Opelt et al., "Fusing Shape and Appearance Information for Object Category Detection", BMVC, 2006.
W. Zhang et al., "Object Class Recognition Using Multiple Layer Boosting with Heterogeneous Features", CVPR, 2005.

\* cited by examiner

SYSTEMS AND METHODS FOR GENERATING A HIGH-LEVEL VISUAL VOCABULARY

BACKGROUND

1. Field

The present disclosure generally relates to forming relationships between image features.

2. Background

Multiple features are sometimes used to recognize objects in images. For example, SIFT features, SURF features, ISA features, CHoG features, GLOH features, DoH features, FAST features and PCBR features have been used to describe images. Detected features may be used to compare images or to identify objects in images.

SUMMARY

In one embodiment, a method comprises generating inter-visual-word relationships between a plurality of visual words based on visual word-label relationships, mapping the visual words to a vector space based on the inter-visual word relationships, and generating high-level visual words in the vector space.

In one embodiment, a device comprises one or more computer-readable media configured to store instructions and one or more processors configured to cause the device to generate mid-level visual words based on a plurality of low-level features that were extracted from images, generate inter-mid-level visual word relationships based on mid-level visual word-label relationships, and map the mid-level visual words to a vector space based on the inter-mid-level visual-word relationships.

In one embodiment, one or more computer-readable media store instructions that, when executed by one or more computing devices, cause the one or more computing devices to perform operations comprising generating initial inter-visual-word relationships between a plurality of visual words based on visual word-label relationships, mapping the visual words to a vector space based on the inter-visual-word relationships; and generating high-level visual words in the vector space based on respective positions of the visual words in the vector space.

DESCRIPTION

The following disclosure describes certain explanatory embodiments. Additionally, the explanatory embodiments may include several novel features, and a particular feature may not be essential to practice the systems and methods described herein.

Figure 1:
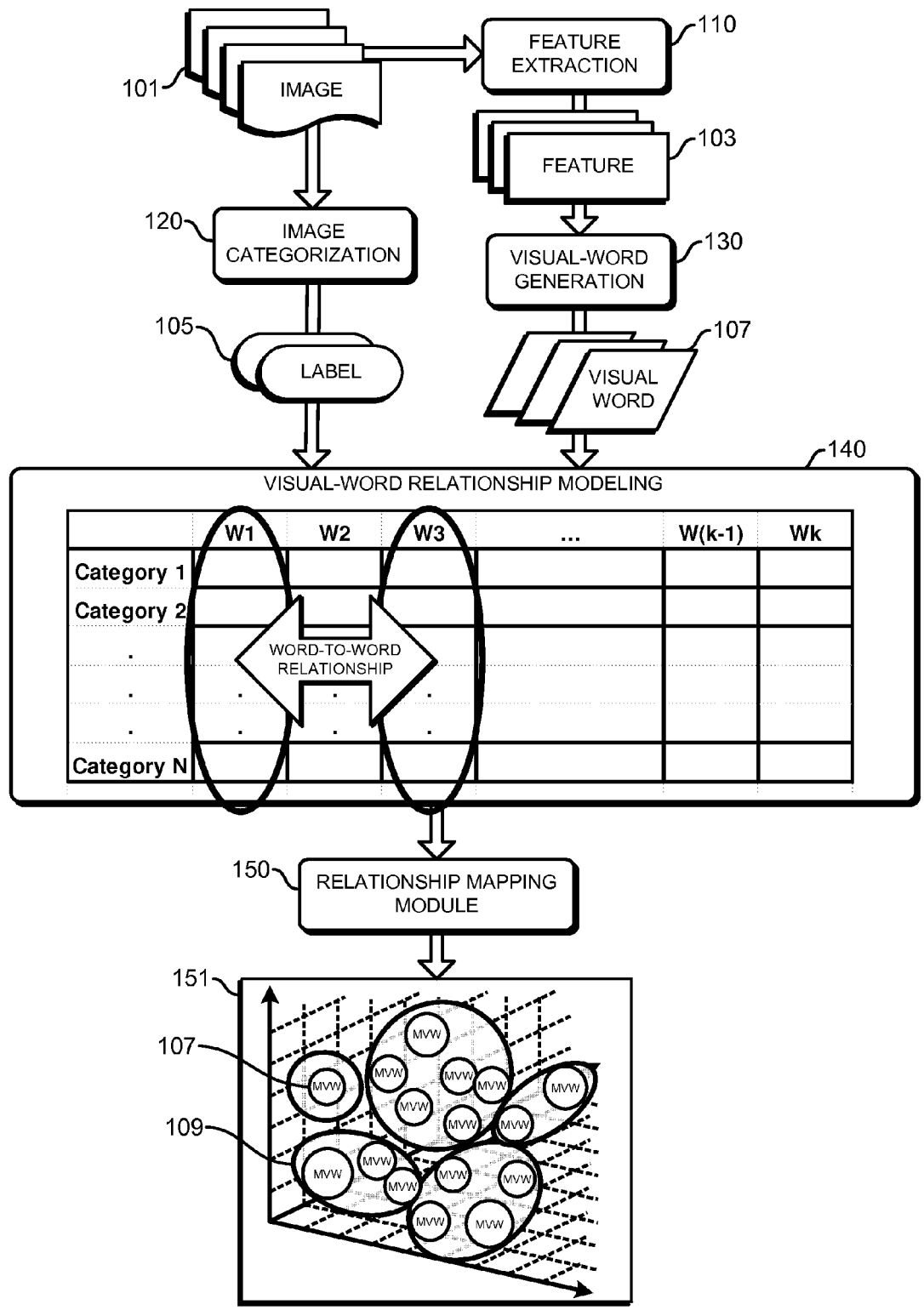
FIG. 1 illustrates an example embodiment of the flow of operations in a feature fusion system.

FIG. 1 illustrates an example embodiment of the flow of operations in a feature fusion system. The system includes one or more computing devices (e.g., desktops, laptops, tablets, servers, phones, PDAs), although only some of the components of the computing devices are shown in FIG. 1 in order to explain the operations. The system includes a feature extraction module 110, which receives one or more images 101 and extracts low-level features 103 from the one or more images 101. Modules include logic, computer-readable data, or computer-executable instructions, and may be implemented in software (e.g., Assembly, C, C++, C#, Java, BASIC, Perl, Visual Basic), firmware, or hardware. In some embodiments, the system includes additional or fewer modules, the modules are combined into fewer modules, or the modules are divided into more modules. Though the computing device or computing devices that execute the instructions in a module actually perform the operations, for purposes of description a module may be described as performing one or more operations.

The features 103 are input to a visual-word-generation module 130. The visual-word-generation module 130 generates mid-level visual words 107 (also referred to herein at "MVWs") based on the low-level features 103, for example by clustering the low-level features in a low-level-features space. In the native low-level-feature space, the positions of the low-level features depend only on the respective visual appearances of the low-level features, which are described by the native attributes of the low-level features. Thus, clustering the low-level features in the low-level-feature space based only on the respective positions of the low-level features in the low-level-feature space produces clusters that are based only on the visual similarity of the low-level features. Also, the images 101 are input to an image-categorization module 120, which determines the respective labels (e.g., categories, tags, semantic labels) 105 that are associated with the images 101.

The mid-level visual words 107 and the labels 105 are input to a visual-word relationship modeling module 140, which generates a model that defines inter-visual-word relationships and visual-word-label relationships. In some embodiments, the representation is a graph (e.g., a co-occurrence graph) that defines relationships among the mid-level features 107 and the labels 105 or the images 101. For example, the edge values of the graph may represent the relationships (e.g., co-occurrences) between the nodes (e.g., mid-level visual words, labels, images) in the graph. In the embodiment shown, the representation is a matrix.

The representation of the relationships (e.g., the graph, the matrix) is then obtained by the relationship mapping module 150, which maps the mid-level visual words 107 to a vector space 151 (e.g., a metric space (for example, a Euclidean space), a lower-dimensional vector space, a vector space defined by orthogonal axes, an embedded vector space) based on the relationships, for example by diffusion mapping. The relationships (e.g., co-occurrences in images, co-occurrences in labels, correlations among labels, correlations among images) between the mid-level visual words 107 are represented as positions in the vector space 151 (e.g., Euclidean distances between the mid-level visual words). For example, the Euclidean distances between the mid-level visual words may be directly proportional to the co-occurrences of the mid-level visual words, where a shorter distance indicates a greater co-occurrence. Thus, the relationships in the representation of the relationships (e.g., the graph, the matrix) may be converted to and represented as distances in the vector space 151. Also, groups of mid-level visual words 107 may be fused to generate high-level visual words 109. Furthermore, in embodiments where the distances between the MVWs represent (e.g., are proportional to) the defined relationships between the MVWs in the graph (or other relationship representation), clustering the MVWs in the vector space 151 may have the effect of clustering the MVWs based on their defined relationships in the graph. Thus, clusters of MVWs in the vector space 151 may be based on their defined relationships, rather than on only visual similarity.

Figure 2:
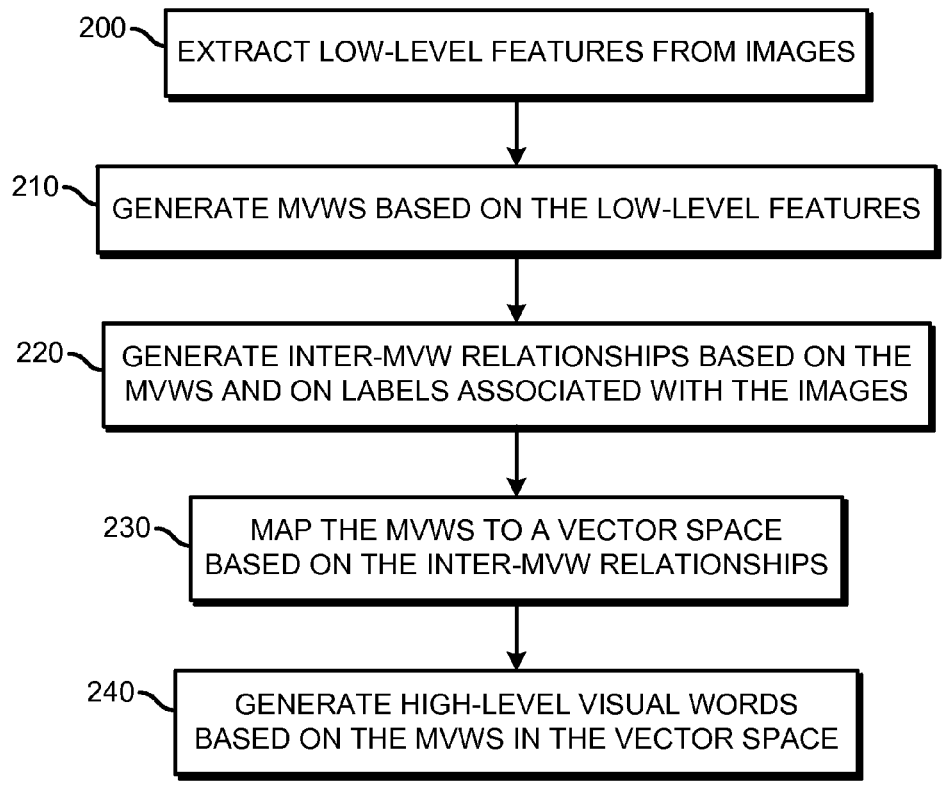
FIG. 2 illustrates an example embodiment of a method for generating high-level visual words.

FIG. 2 illustrates an example embodiment of a method for generating high-level visual words. The blocks of this method and the other methods described herein may be performed by one or more computing devices, for example the systems and devices described herein. Also, other embodiments of this method and the other methods described herein may omit blocks, add blocks, change the order of the blocks, combine blocks, or divide blocks into more blocks.

The flow starts in block 200, where low-level features are extracted from one or more images. For example, some embodiments extract the color-SIFT features from images to obtain the low-level features. The SIFT descriptor basically characterizes the local edge distribution around key points. Extension to color considers color gradients, rather than intensity gradients, and puts color gradients into the Gaussian derivative framework. In color SIFT, the first vector of 128 bytes in the descriptor carries all intensity related information, whereas the second and third vectors contain the orthogonal chromatic information. Hence, intensity, shadow, and shading effects are present in the intensity vector, whereas the pure chromatic information is carried by the additional color vectors. The low-level color SIFT features are denoted as $x^{(i)} \in \mathbb{R}^{128 \times 3}$.

Next, in block 210, MVWs F are generated based on the low-level features. For example, some embodiments use k-means to learn the codebook centers $F \in \mathbb{R}^{128 \times 3}$ from the low-level features X to basically cluster the low-level features with similar appearance into groups, and a group is designated as a respective MVW $F_i$. If the codebook centers are later used as nodes to construct a graph, this reduces the number of nodes and the computational complexity (e.g., computing the co-occurrence matrix S and its Eigen-decomposition).

The flow then proceeds to block 220, wherein inter-MVW relationships are generated based on the MVWs F and on labels associated with the images. For example, some embodiments statistically capture the similarity (e.g., co-occurrence) between MVWs F using the label information of the images. A word-label (e.g., MVW-label) similarity matrix S may be generated by counting the frequency of each MVW's appearance with each label, denoted as f(i, q).

Furthermore, through normalizing f(i, q) by the corresponding row sum, the joint probability that MVW $F_i$ appears with label q, denoted as p(i, q), can be obtained:

$$p(i, q) \propto p(i|q) = \frac{f(i, q)}{\sum_j f(j, q)}. \qquad (1)$$

Each MVW $F_i$ can be further described by its distribution over all the labels. The similarity matrix S, which measures the sharing of information between two MVWs ($F_i$, $F_j$), can be computed by comparing their distributions using KL divergence:

$$S(F_i \| F_j) = KL(P_i \| P_j) = \sum_{q \in N} p(i, q) \log \frac{p(i, q)}{p(j, q)}. \qquad (2)$$

To force the similarity matrix S to be symmetric, the average of the KL divergence between each pair of MVWs can be computed:

$$S(F_i, F_j) = S(F_j, F_i) = \tfrac{1}{2}[KL(P_i \| P_j) + KL(P_j \| P_i)].$$

Once the similarity matrix S is obtained, a graph G (V, E) can be generated, where V is the node (e.g., MVW, label) and E is the edge (e.g., the edge weight from the similarity matrix S).

Next, in block 230, the MVWs F are mapped to a vector space based on the inter-MVW relationships. For example, the pairwise similarities can be interpreted as edge flows in a Markov random walk on the graph. Hence, the similarity between two nodes can be analogous to the transition probability on the edge. By conducting the random walk for t number of transition steps, the transition probability can be propagated from one node to another through others. The diffusion distance D between two nodes can be defined based on the random walk. Using spectral analysis of a transition matrix P (e.g., a Markov transition matrix), the d dominant eigenvectors can be found. The d dominant eigenvectors can be used as the coordinates of the vector space, and the MVWs F (or other nodes) can be projected into the vector space while preserving the diffusion distances of the nodes.

For example, a normalized edge weight can be treated as the transition probability between two nodes, and consequently, a transition matrix $P = P^{(1)} = \{p_{ij}^{(1)}\}$ can be constructed by normalizing a weight matrix W such that its rows add up to 1:

$$p_{ij} = w_{ij} \bigg/ \sum_k w_{ik}.$$

The transition matrix P can be considered to be the transition kernel of the Markov chain on the graph G, which governs the evolution of the chain on the space. In other words, $p_{ij}^{(1)}$ defines the transition probability from node i to j in a single transition step, and the transition matrix P defines the entire Markov chain. $P^{(1)}$ indicates the first-order neighborhood geometry of the data. The random walk may be run forward in time to capture information about larger neighborhoods by taking powers of the transition matrix P. The forward-probability matrix for t number of transition steps $P^{(t)}$ is given by $P^{(1)t}$. The number of transition steps t could be any real number (e.g., 1, 2, 3, 3.75). The entries in $P^{(t)}$ represent the probability of going from i to j in t transition steps.

In such embodiments, a cluster is a region in which the probability of the Markov chain escaping the region is low. The higher the value of t (i.e., the more transition steps), the higher the likelihood of diffusing to further away points. The transition matrix $P^{(t)}$ thus reflects the intrinsic structure of the data set, defined via the connectivity of the graph G, in a diffusion process, and the diffusion steps (e.g., the number of transition steps t) play the role of a scale parameter in the data analysis. Generally, fewer diffusion steps means higher data resolution, or finer scale structure representation, and vice versa.

The diffusion distance D between two nodes (e.g., MVWs, low-level features, labels, images) on the graph G can be defined using the random-walk forward probabilities $p_{ij}^{(t)}$ to relate the spectral properties of a Markov chain (e.g., its transition matrix, eigenvalues, and eigenvectors) to the underlying structure of the data. The diffusion distance D represents the similarity between two data points, $z_i$ and $z_j$, by comparing the likelihoods that a Markov chain transits from each of them to the same node $z_q$ by following any arbitrary path of length t transition steps. The diffusion distance D between two such data points can be calculated according to $$[D^{(t)}(z_i, z_j)]^2 = \sum_{q \in Z} \frac{(p_{iq}^{(t)} - p_{jq}^{(t)})^2}{\varphi(z_q)^{(0)}},$$

where $\phi(z_q)^{(0)}$ is the stationary distribution that measures the density of the MVWs (or other nodes). It is defined according to $\phi(z_q)^{(0)} = d_q/\Sigma_j d_j$, where $d_q$ is the degree of node $z_q$, defined by $d_q = \Sigma_j p_{qj}$. A pair of MVWs with a high forward-transition probability has a small diffusion distance. In other words, the diffusion distance D will be small between two MVWs if the MVWs are connected by many t-length paths in the graph G. This notion of proximity of MVWs in the graph G reflects the intrinsic structure of the set in terms of connectivity of the MVWs in a diffusion process. Because the diffusion distance D may be computed using all (or nearly all) possible paths through the graph, compared to the shortest path method (e.g., the geodesic distance), the diffusion distance D may take into account all of, or nearly all of, the evidence relating $z_i$ to $z_j$, and therefore may be more robust to noise.

The Eigen decomposition of the transition matrix P is shown below. Each row of matrix $\{\phi_i(z_j)\}$ corresponds to a right eigenvector of the transition matrix P. All the eigenvectors are orthonormal to each other, and the eigenvectors form a basis on the vector space, where the projection (e.g., coordinate) of a feature $z_j$ on the eigenvector $\phi_i$ is $\phi_i(z_j)$. Hence, the $j^{th}$ column of matrix $\{\phi_i(z_j)\}$ is the projection of the data point $z_j$. Due to the decay of eigenvalues, d eigenvectors corresponding to the d largest eigenvalues can be selected to construct a lower-dimensional vector space that captures most information in the original higher-dimensional vector space.

$$P = \begin{bmatrix} \varphi_1(z_1) & \varphi_1(z_2) & \cdots & \varphi_1(z_m) \\ \varphi_2(z_1) & \varphi_2(z_2) & & \varphi_2(z_m) \\ \vdots & \vdots & \vdots & \vdots \\ \varphi_d(z_1) & \varphi_d(z_2) & & \varphi_d(z_m) \\ \vdots & \vdots & \vdots & \vdots \\ \varphi_m(z_1) & \varphi_m(z_2) & \cdots & \varphi_m(z_m) \end{bmatrix} \begin{bmatrix} \lambda_1 & & & 0 \\ & \lambda_2 & & \\ & & \ddots & \\ 0 & & & \lambda_m \end{bmatrix} \begin{bmatrix} \Phi_1^T \\ \Phi_2^T \\ \vdots \\ \Phi_m^T \end{bmatrix}.$$

Also, after calculating the eigenvalues and eigenvectors of the transition matrix P, the nodes can be embedded into a d-dimensional vector space that was created by choosing the first d eigenvectors and eigenvalues. In that space, the diffusion distance D is approximated by, or is equal to, the Euclidean distance. The diffusion distance D in the d-dimensional vector space can be approximated according to $$[D^{(t)}(z_i, z_j)]^2 \approx \sum_{s=2}^{d+1} (\lambda_s^t)^2 (\varphi_s(z_i) - \varphi_s(z_j))^2.$$

Additionally, devices, systems, and methods for mapping the MVWs to the vector space are further described in U.S. patent application Ser. No. 13/829,338 by Yang Yang et al., filed on Mar. 14, 2013, which is hereby incorporated by reference in its entirety.

Finally, in block 240, high-level visual words (also referred to herein as "HVWs") are generated based on the MVWs in the vector space. For example, in some embodiments closely related MVWs, which are located more closely to each other in the vector space, are further grouped into K HVWs. Given a new mid-level feature $F'_i$ in the vector space, the HVW may calculated according to equation (4) in a soft assignment manner:

$$H_k(F'_i) = \max\{0, \mu(z) - z_k\}, \quad (4)$$

where $z_k = \|F'_i - c^{(k)}\|_2$, $c^{(k)}$ is the cluster centers, and $\mu(z)$ is the mean of the elements of z (e.g., the mean of $z_1, z_2, \ldots$). This function outputs zero for any HVW $H_k$ where the distance to the centroid $c^{(k)}$ is above average.

Figure 3:
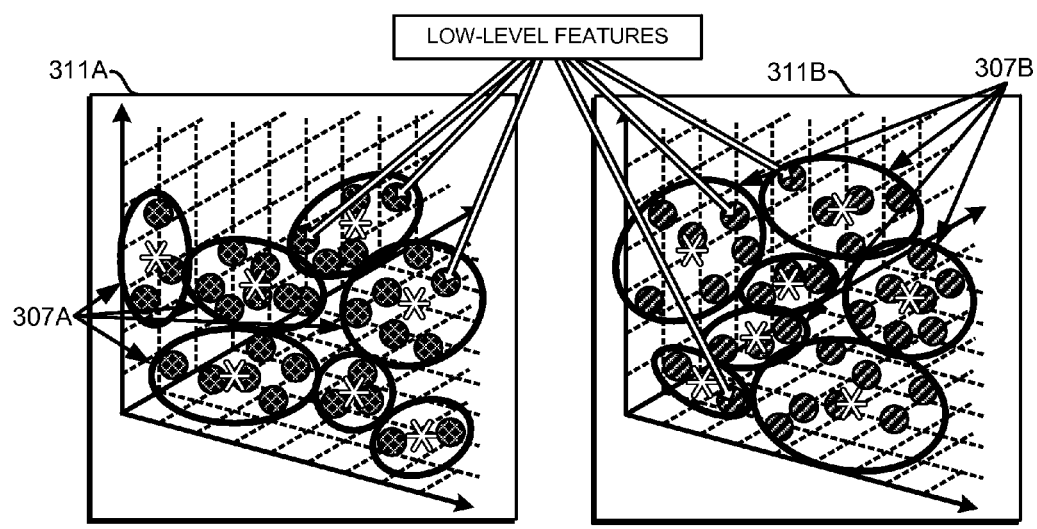
FIG. 3 illustrates example embodiments of mid-level visual words in the low-level feature space.

FIG. 3 illustrates example embodiments of mid-level visual words in the low-level feature space (e.g., the native space of the low-level features). A first set of MVWs 307A are shown in a first low-level feature space 311A and a second set of MVWs 307B are shown in a second low-level feature space 311B. The MVWs are formed from groups (e.g., clusters) of low-level features in the low-level feature spaces 311A-B. Because the low-level feature spaces 311A-B includes only dimensions based on the visual appearance of the features (e.g., 128 SIFT dimensions), the MVWs 307A-B are based only on the visual appearances of the low-level features.

Figures 4A, 4B:
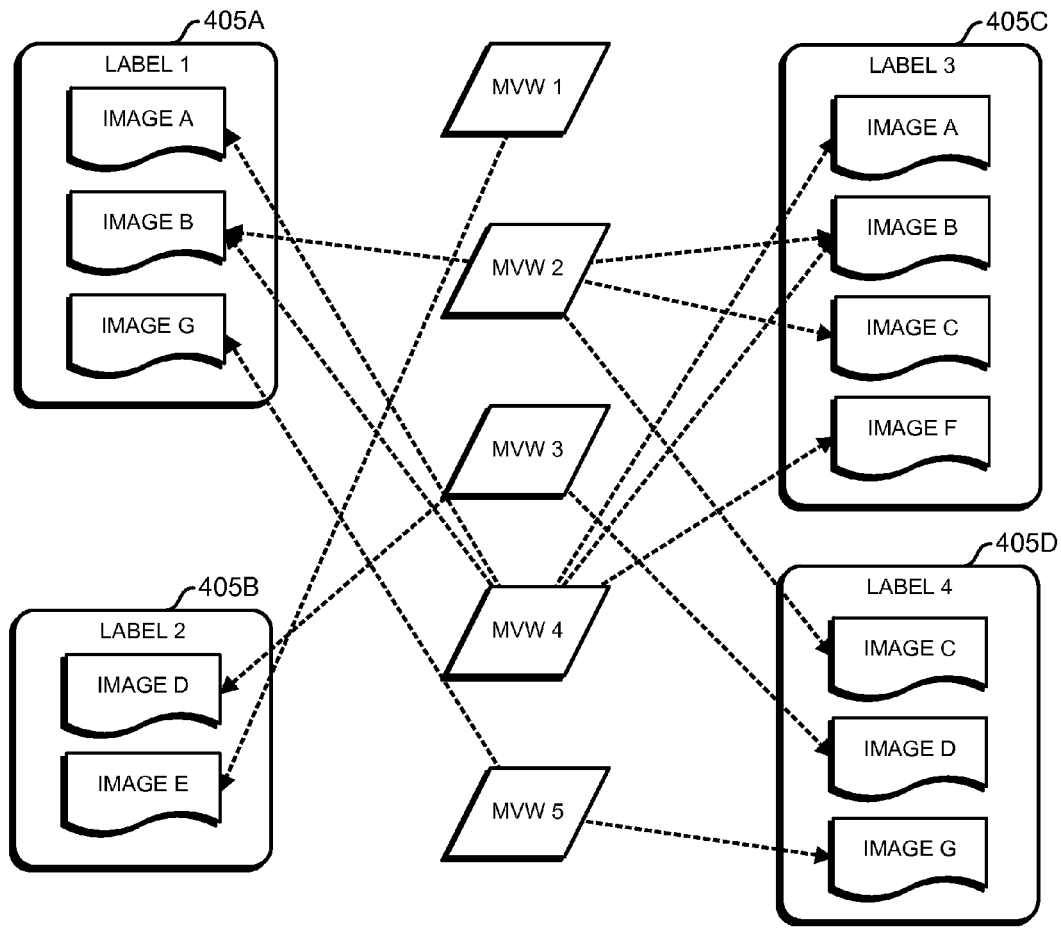
FIG. 4A illustrates an example embodiment of relationships among mid-level visual words and labels.
FIG. 4B illustrates an example embodiment of a co-occurrence matrix of mid-level visual words and labels.

FIG. 4A illustrates an example embodiment of relationships among MVWs and labels. The MVWs are associated with various images. For example, if one or more low-level features that map to a MVW are detected in an image, then the MVW may be associated with the image. Thus, if a low-level feature extracted from image B maps to MVW 2, then MVW 2 is considered to be associated with image B.

Also, the images are also associated with various labels 405A-D, for example tags that have been assigned to an image by a user. Additionally, if an image is associated with a label, then an MVW associated with the image is also associated with the label. A table or matrix can be generated that contains information that describes the relationships of the MVWs and labels. FIG. 4B illustrates an example embodiment of a co-occurrence matrix of mid-level visual words and labels. The matrix in FIG. 4B shows the count of the appearances of each MVW with each label in FIG. 4A. For example, MVW 1 co-occurs with Label 2 one time (via image E). MVW 4 co-occurs with label 1 two times and co-occurs with label 3 three times.

Figure 5:
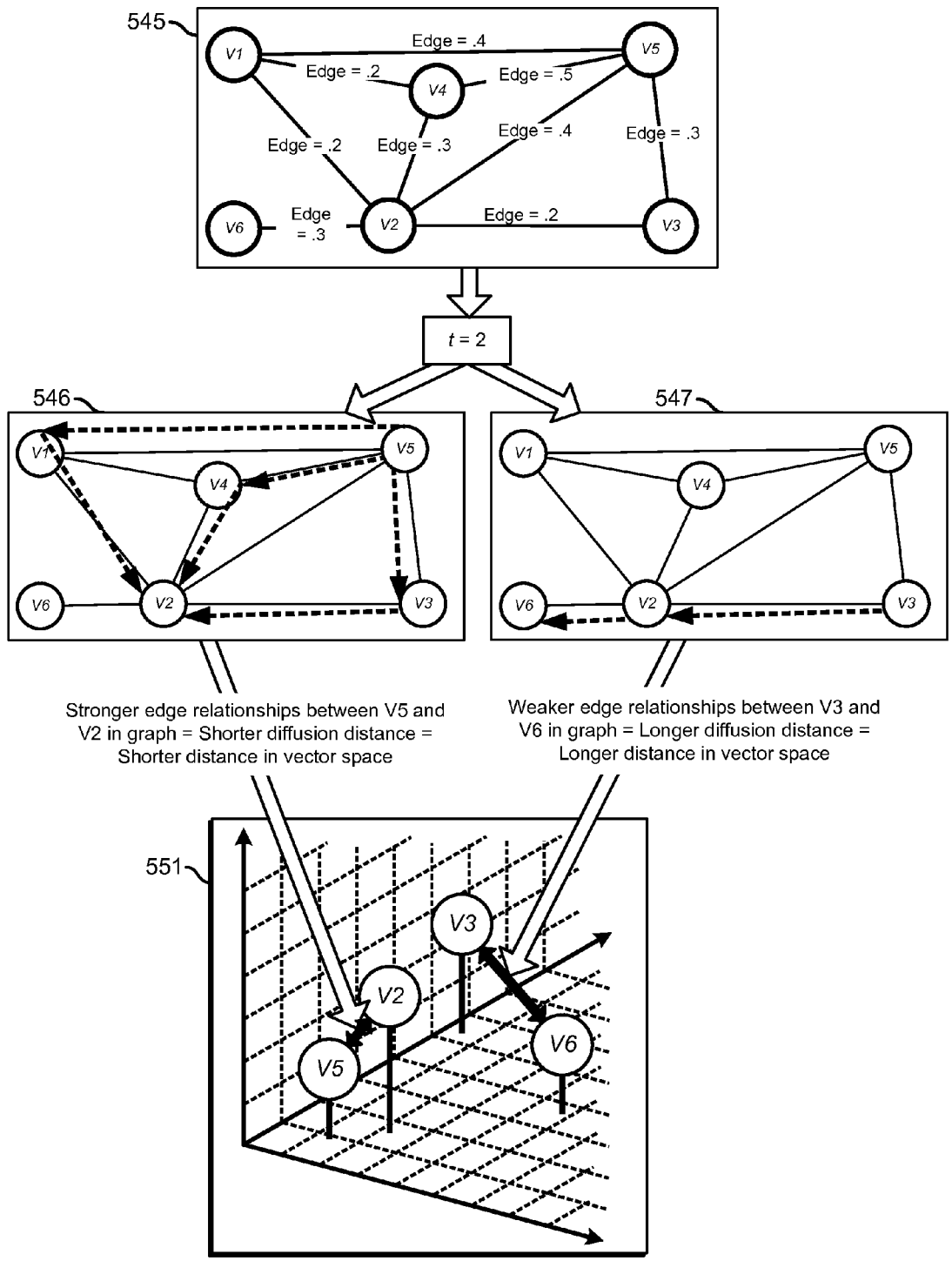
FIG. 5 illustrates an example embodiment of the mapping of relationships from a graph to a vector space.

FIG. 5 illustrates an example embodiment of the mapping of relationships from a graph 545 to a vector space 551. The graph 545 shows the edge values between the nodes V1-V6. In this example, a value of 2 is selected for the number of transition steps t. The entries in $P^{(t)}$ represent the probability of going from i to j in t transition steps. A first set of paths 546 shows the three paths from V5 to V2 at t=2. A second set of paths 547 shows the one path from V3 to V6 at t=2. The nodes (e.g., MVWs) are mapped to a vector space 551 based on their relationships. In the vector space 551, nodes V2 and V5 are closer because of their stronger relationship in the graph 545. Also, in the vector space 551, nodes V3 and V6 are further apart because of their weaker relationship in the graph 545. Therefore, the Euclidean distances between the nodes in the vector space 551 indicates the relationships between the nodes in the graph 545.

Figure 6:
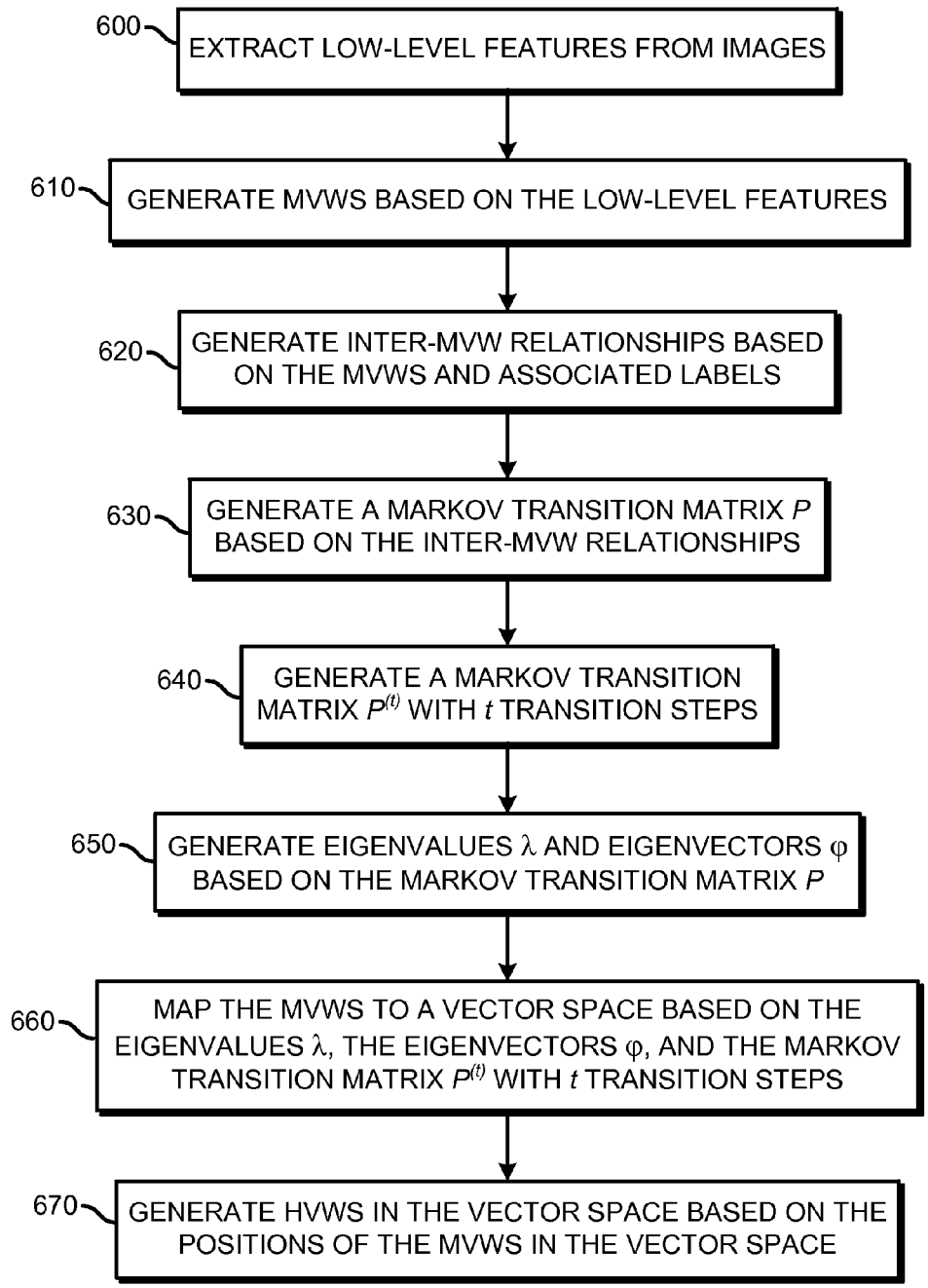
FIG. 6 illustrates an example embodiment of a method for generating high-level visual words.

FIG. 6 illustrates an example embodiment of a method for generating high-level visual words. The flow starts in block 600, where low-level features are extracted from images. For example, some embodiments extract low-level features X (e.g., raw features X). Next, in block 610, MVWs are generated based on the low-level features X. For example, low-level features X may be quantized into MVWs F with size $N_{mid}$ using k-means clustering. The flow then moves to block 620, where inter-MVW relationships (i.e., MVW-MVW relationships) are generated based on the MVWs and on labels associated with the MVWs (e.g., labels associated with the MVWs via the images). For example, some embodiments generate a graph G and a similarity matrix S using equations (1), (2), and (3).

Next, in block 630, a Markov transition matrix P is generated based on the inter-MVW relationships. For example, the similarity matrix S may be normalized such that its rows each add up to 1. The flow then proceeds to block 640, where a Markov transition matrix $P^{(t)}$ with t number of transition steps (also referred to herein as "a Markov transition matrix $P^{(t)}$ with t transition steps") is generated. The flow then moves to block 650, where eigenvalues λ and eigenvectors ϕ are generated based on the Markov transition matrix $P^{(t)}$. Next, in block 660, the MVWs are mapped to a vector space based on the eigenvalues λ, the eigenvectors ϕ, and the Markov transition matrix $P^{(t)}$ with t transition steps. For example, the MVWs and their relationships may be embedded in the vector space.

The flow then proceeds to block 670, where HVWs are generated in the vector space based on the positions of the MVWs in the vector space. For example, the MVWs may be clustered in a d-dimensional vector space into K groups using k-means clustering, and the cluster centers c may be saved. Then, given a mid-level feature $F'_i$ in the vector space, the corresponding HVW may be calculated using equation (4), for example. Some embodiments use soft assignment to assign MVWs in new image to the created HVWs.

For example, one embodiment of a method was tested on a subset of the ImageNet dataset. The subset had 100 object categories, each having around 1000 examples for training and 100 for testing. The training set was used to learn the HVW centers and the corresponding classifiers.

For the color-SIFT features, SIFT interesting-point detection was used, and the features were extracted around the interesting point based on three channels. After getting the color-SIFT features, the color-SIFT MVWs were generated using k-means clustering with $N_{mid}$=3000. Next, the MVW-label similarity matrix S was constructed. The similarity matrix S was constructed using the Gaussian kernel function with sigma equals 2. The Markov random walk was performed using 4 (t=4) transition steps to construct a forward-probability matrix $P^{(4)}$. Through Eigen-decomposition and choosing eight hundred dimensions (d=800), the color-SIFT MVWs and images were embedded into an 800-dimensional vector space. In the vector space, the MVWs were clustered into 1000 (K=1000) groups, which correspond to the HVWs.

Finally, each image was represented using the soft assigned HVWs and one or more respective corresponding classifiers were trained on the HVWs.

The embodiment of the method was compared with three other methods: the traditional bag-of-word method (BOW), a method that uses PMI, and a method that uses hard-assigned HVWs. The BOW method also uses color-SIFT features as low-level features and uses k-means to learn a codebook with size of 1000. A k-nearest-neighbor classifier was used with a cosine kernel for all methods. Table 1 shows the error rate for each method.

TABLE 1

Recognition error results.

| | BOW Method | PMI Method | Example embodiment (hard assignment) | Example embodiment (soft assignment) |
|---|---|---|---|---|
| First 5 categories | 0.47 | 0.455 | 0.411 | 0.389 |
| 100 categories | 0.79 | 0.772 | 0.753 | 0.731 |

Figure 7:
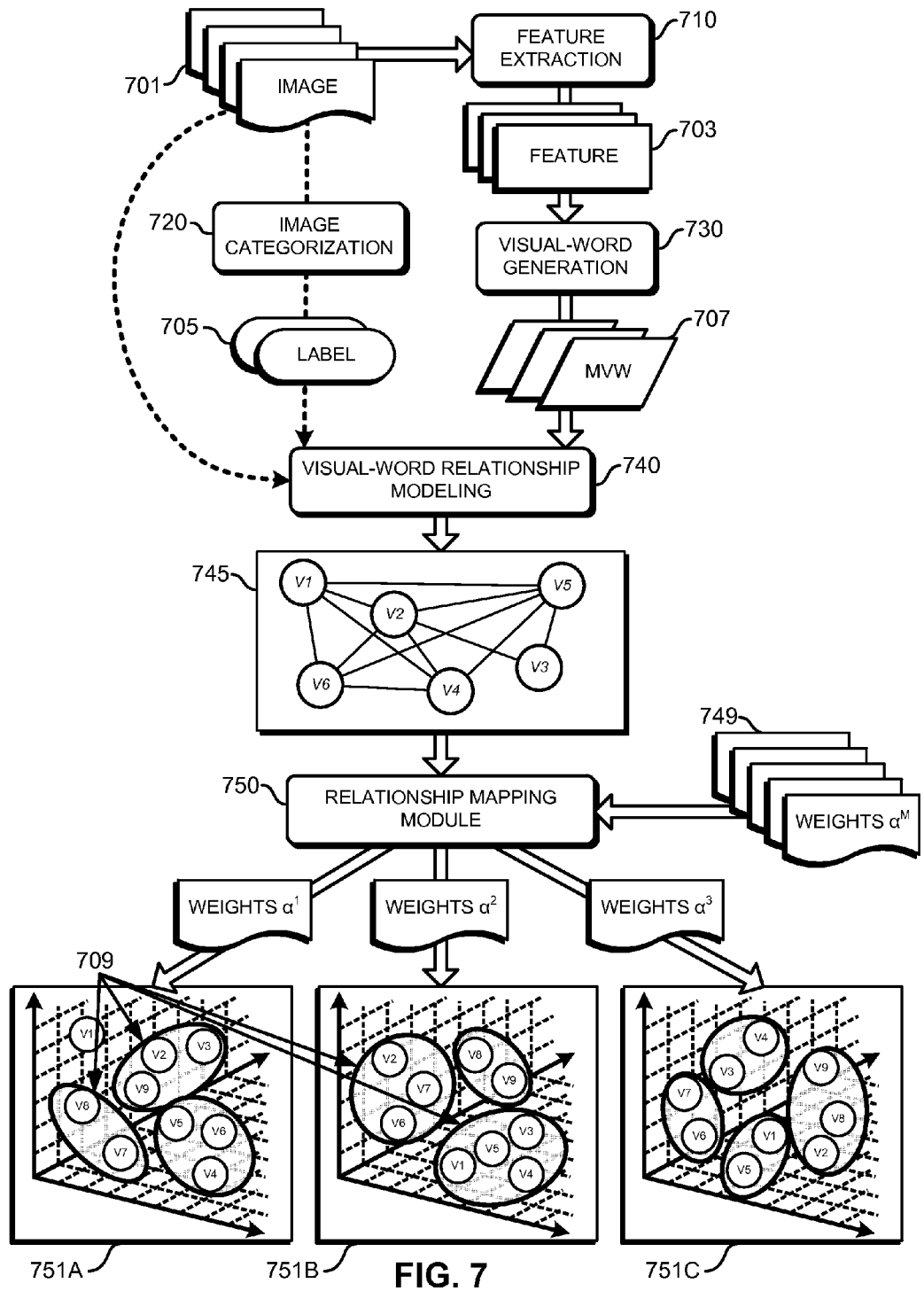
FIG. 7 illustrates an example embodiment of the flow of operations in a feature fusion system.

FIG. 7 illustrates an example embodiment of the flow of operations in a feature fusion system. The system includes one or more computing devices (e.g., desktops, laptops, tablets, servers, phones, PDAs), although only some of the components of the computing devices are shown in FIG. 7 in order to explain the operations. The system includes a feature-extraction module 710, which receives one or more images 701 and extracts low-level features 703 from the one or more images 701.

The low-level features 703 are input to a visual-word-generation module 730. The visual-word-generation module 730 generates MVWs 707 based on the low-level features 703, for example by clustering the low-level features 703 in a low-level-features space. Also, in some embodiments the images 701 are input to an image-categorization module 720, which determines the respective labels 705 (e.g., categories, tags, semantic labels) that are associated with the images 701.

The mid-level visual words 707, and in some embodiments, the images 701 or the labels 705, are input to a visual-word relationship-modeling module 740, which generates a model 745 (e.g., the graph shown in FIG. 7) that defines inter-visual-word relationships and visual-word-label relationships. The computing device that implements the method does not need to "draw" a visual graph in every embodiment. For example, some embodiments may define the nodes and the edges without "drawing" a visual graph.

The representation 745 is then obtained by the relationship-mapping module 750. The relationship-mapping module 750 also obtains sets of importance weights 749. A set of importance weights, for example $\alpha_i^m$, defines respective weights for all of the objects (e.g., MVWs, labels, images) in the representation 745. For example, $\alpha_1^1$ defines a weight for object 1 in a first set of importance weights, $\alpha_2^1$ defines a weight for object 2 in the first set of importance weights, $\alpha_1^2$ defines a weight for object 1 in a second set of importance weights, $\alpha_2^2$ defines a weight for object 2 in the second set of importance weights, etc. Based on the representation 745 and the sets of importance weights 749, the relationship-mapping module maps the MVWs 707 (and, in some embodiments, other objects (e.g., labels, images)) to vector spaces 751A-C, for example to a respective vector space 751 for each of the sets of importance weights 749. Thus, a first vector space 751A is based on a first set of importance weights $\alpha_i^1$, etc.

In the vector spaces 751, groups of MVWs 107 may be fused to generate HVWs 709 (not all of the HVWs are labeled in FIG. 7). The HVWs 709 may not extend across vector spaces 751. The HVWs in the different vector spaces allow the HVWs to closely relate two nodes A and B to a third node C without closely relating the two nodes A and B to each other. When a Markov random walk is performed on the graph and the diffusion distance is based on the random walk, more nodes (e.g., features, MVWs, labels, images) can be considered to be neighbors when a larger diffusion distance is used (e.g., a larger transition step t). For example, if 'cat ears' always co-occurs with 'cat noses', and 'cat noses' always co-occurs with 'cat eyes', then 'cat ears' must also often co-occur with 'cat eyes.' Some embodiments work fairly well when the number of random-walk transition steps t is small (around 2-5), but when the number of transition steps t is increased further, the recognition accuracy may quickly decrease. The reason for this decrease is that when the number of transition steps t is large, the similarity relationships between the nodes are further diffusing along a random path, and more and more nodes on the path are considered to be similar to the starting node. Hence, more nodes will be grouped into one cluster as an HVW. However, when the co-occurrence similarities between nodes are non-metric, the diffusion of nodes may not be meaningful. For example, though the word 'tie' always co-occurs with the word 'cloth' and the word 'rope', 'rope' and 'cloth' may not always co-occur together. In object recognition, though the visual word 'green grass' may often co-occur with 'cat eyes' and 'tires', 'cat eyes' and 'tires' do not usually belong to the same topic. However, by generating different vector spaces 751, different HVWs 709 may be generated that can model non-metric similarities between features and MVWs.

Figure 8:
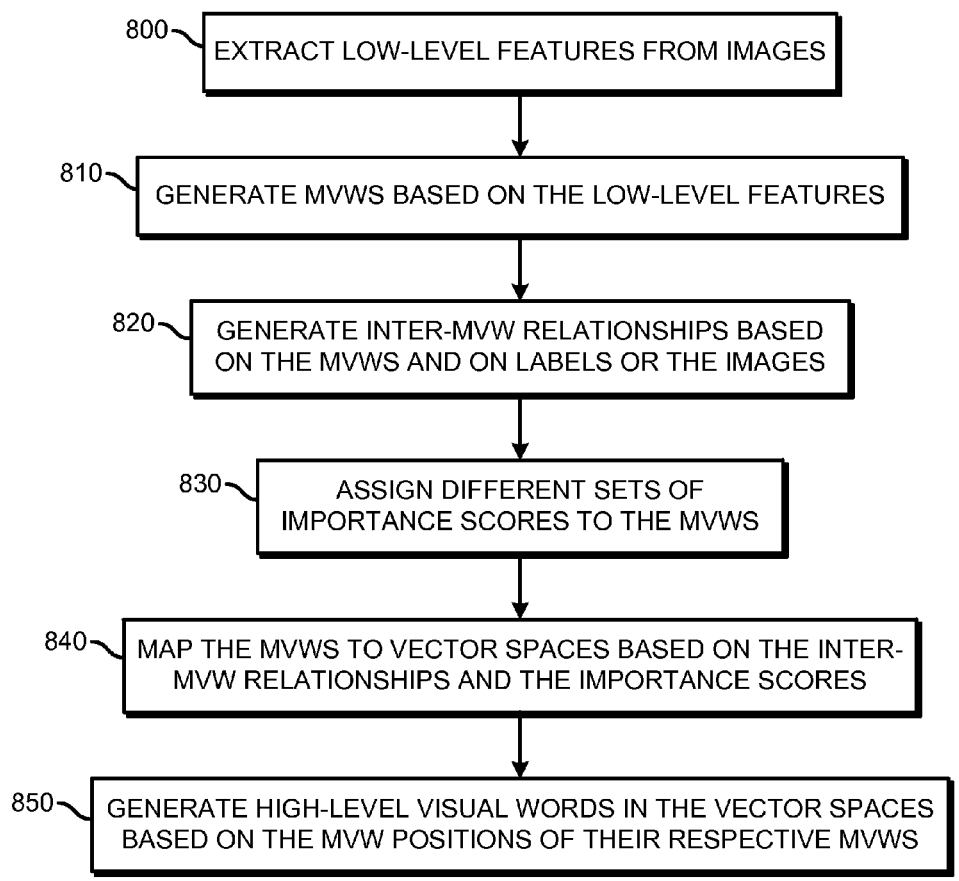
FIG. 8 illustrates an example embodiment of a method for generating high-level visual words.

FIG. 8 illustrates an example embodiment of a method for generating high-level visual words. The flow starts in block 800, where low-level features are extracted from images. Next, in block 810, MVWs are generated based on the low-level features. The flow then moves to block 820, where inter-MVW relationships are generated based on the MVWs and maybe on the images or labels that are associated with the images, for example according to equations (1), (2), and (3). Also, a transition matrix P can be generated by dividing the row sums of the similarity matrix S:

$$p(i, j) = \frac{s(i, j)}{\sum_j s(i, j)}. \quad (5)$$

The transition matrix P includes joint probabilities that define the probabilities between all of the pairs of nodes based on their similarities.

Next, in block 830 different sets of importance scores are assigned to the MVWs. In each set of importance scores with index m (one for each of M vector spaces), a point (e.g., MVW, image, label) with index i has an importance weight $\alpha_i^m$ that measures the importance of point i in set m and a corresponding vector space. Because of the probabilistic interpretation of some embodiments of the model, $\Sigma_{m=1}^M \alpha_i^m$ may be constrained to be 1. The importance score $\alpha_i^m$ may be more conveniently represented using $\theta_i^m$, whereby the two are related by the following relationship which enforces the sum-to-one constraint on the importance weights $\alpha_i^m$ over the M vector spaces:

$$\alpha_i^m = \frac{e^{-\theta_i^m}}{\sum_m e^{-\theta_i^m}}. \quad (6)$$

The flow then proceeds to block 840, where the MVWs are mapped to vector spaces based on the inter-MVW relationships and the importance scores. The MVWs are mapped to multiple vector spaces (e.g., two-dimensional vector spaces), for example one vector space for each set of importance scores, in such a way that the pairwise similarities $p_{ij}$ are modeled as well as possible in the vector spaces. Within each vector space, the similarity between two points can be calculated through the Euclidean distance between the two points; between the vector spaces, the points are independent and have no similarity measurement. Multiple vector spaces are used, for example, when the similarities of MVWs are usually non-metric and a single vector space cannot model multiple metrics.

Some embodiments use a Student's t-distribution ("t-SNE"), and a vector space constructed by t-SNE is designated by $Y=\{y_1, \ldots, y_N\}$. To evaluate the pairwise similarities of the points $y_i$ and $y_j$ in lower-dimensional vector spaces, $q_{ij}$ designates the low-dimensional counterpart of $p_{ij}$. The error between the input similarities $p_{ij}$ and their counterparts $q_{ij}$ in the low-dimensional vector space may be measured according to the KL-divergence between the distributions P and Q. A cost function C(Y) may be defined according to $$C(Y) = KL(P\|Q) = \sum_i \sum_{j \neq i} p_{ij} \log \frac{p_{ij}}{q_{ij}}. \quad (7)$$

Due to the asymmetric nature of the KL-divergence, the cost function C(Y) focuses on appropriately modeling the large pairwise similarities $p_{ij}$ between the input data. This forces similar input data to be closer together in the low-dimensional vector space in order to minimize the cost function C(Y). In embodiments of the cost function C(Y) that are generally non-convex, the minimization of C(Y) may be performed using a gradient descent method.

The joint probabilities $q_{ij}$ that measure the similarities between the points $y_i$ and $y_j$ in a single low-dimensional (e.g., two-dimensional) map may be defined according to equation (8) (below):

$$q_{ij} = \frac{(1 + \|y_i - y_j\|^2)^{-1}}{\sum_k \sum_{l \neq k} (1 + \|y_k - y_l\|^2)^{-1}}. \quad (8)$$

One property of some embodiments of t-SNE is that, in the low-dimensional vector space, the similarity between two points is proportional to a Student's t-distribution with a single degree of freedom, instead of being proportional to a Gaussian density. By using a heavy-tailed distribution to measure similarities in the low-dimensional vector space, t-SNE allows points that are only slightly similar to be visualized much further apart in the vector space.

Furthermore, a single vector space usually cannot model the non-metric similarities; therefore multiple vector spaces may be needed to capture the different metrics between MVWs. The multiple vector spaces construct a collection of M vector spaces, each of which contains N points (one for each of the N mid-level visual words) and assigns importance weights $\alpha_i^m$ (at least some of which may be different from other vector spaces) to the N points. Also, in some embodiments, points in the vector space represent other objects than MVWs (e.g., images, labels). Mathematically, $q_{ij}$ in the multiple-vector-space t-SNE model may be defined according to $$q_{ij} = \frac{\sum_m \alpha_i^m \alpha_j^m (1 + \|y_i^m - y_j^m\|^2)^{-1}}{\sum_k \sum_{l \neq k} \sum_m \alpha_k^m \alpha_l^m (1 + \|y_k^m - y_l^m\|^2)^{-1}}. \quad (9)$$

The multiple-map t-SNE may use the cost function C(Y) of equation (7). To solve equation (7), gradient descent may be used to optimize it with respect to the N×M low-dimensional map points $y_i^m$ and with respect to the N×M importance weights $\alpha_i^m$. In some embodiments, the dimensionality of the vector space points is equal to 2, and N is the number of mid-level features.

The flow then proceeds to block 850, where HVWs are generated in the vector spaces based on their respective MVW positions. For example, the MVWs may be embedded into M vector spaces with respective importance scores, the MVWs in each vector space may be clustered, and the clusters with the higher importance scores may be selected for HVWs.

Figure 9:
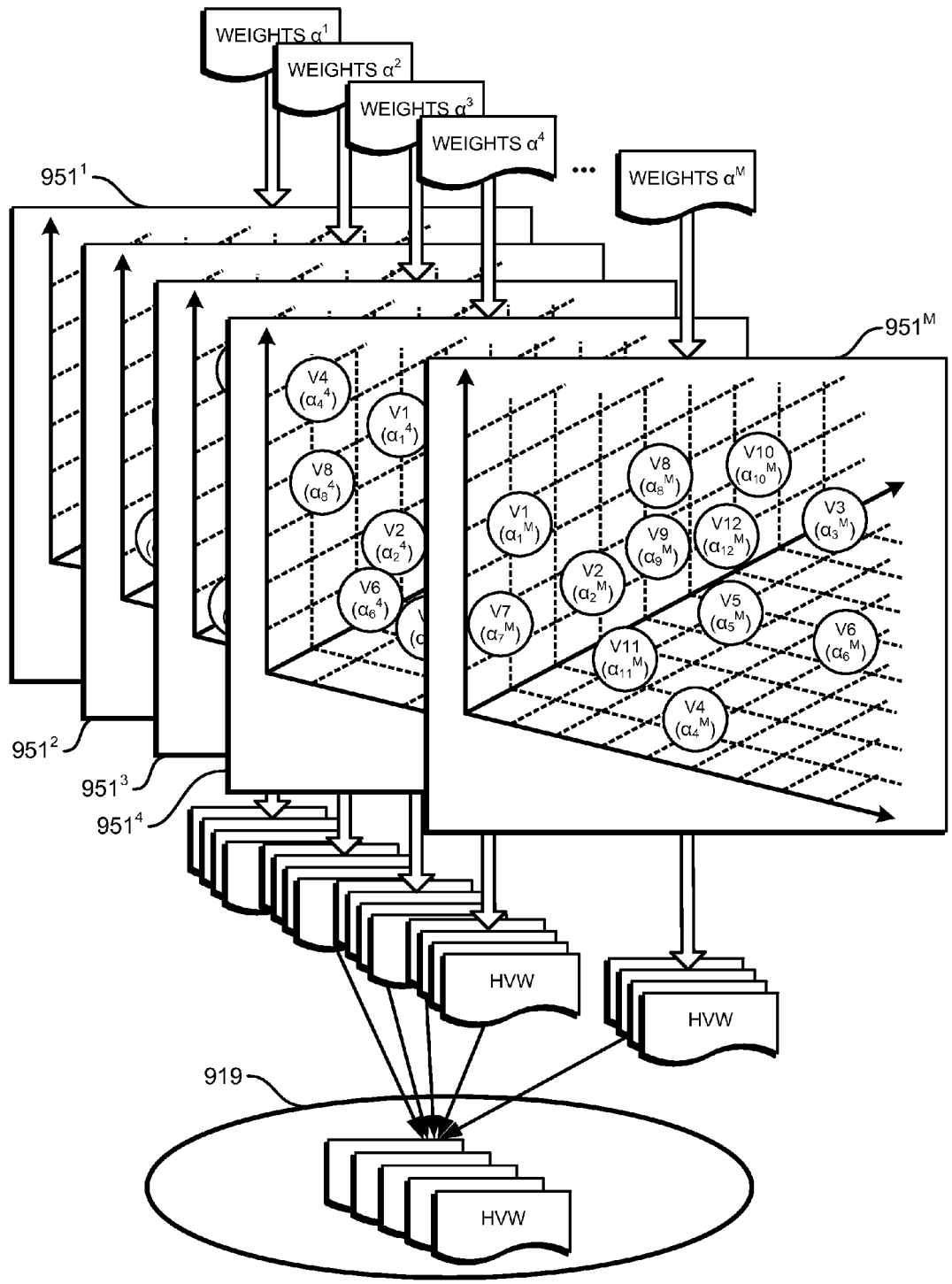
FIG. 9 illustrates an example embodiment of a set of vector spaces and importance weights.

FIG. 9 illustrates an example embodiment of a set of vector spaces and importance weights. Sets 1 to M of importance weights $\alpha_i^m$ are used to generate respective vector spaces 951. The vector spaces 951 each include mid-level visual words V1-V12, but assign one or more of the mid-level visual words V1-V12 importance weights that differ from the importance weights that the other sets assign the same visual words. For example, MVW V1 may be assigned an importance weight in a first vector space $951^1$ that is different from the importance weight of MVW V1 in a third vector space $951^3$. HVWs are generated in the vector spaces 951 based on the MVWs and the respective importance weights of the MVWs. Also, HVWs may each be assigned a respective importance score. The HVWs that have higher importance scores (e.g., scores that exceed a threshold, a certain highest percentile of scores) may be selected for a vocabulary 919.

Figure 10:
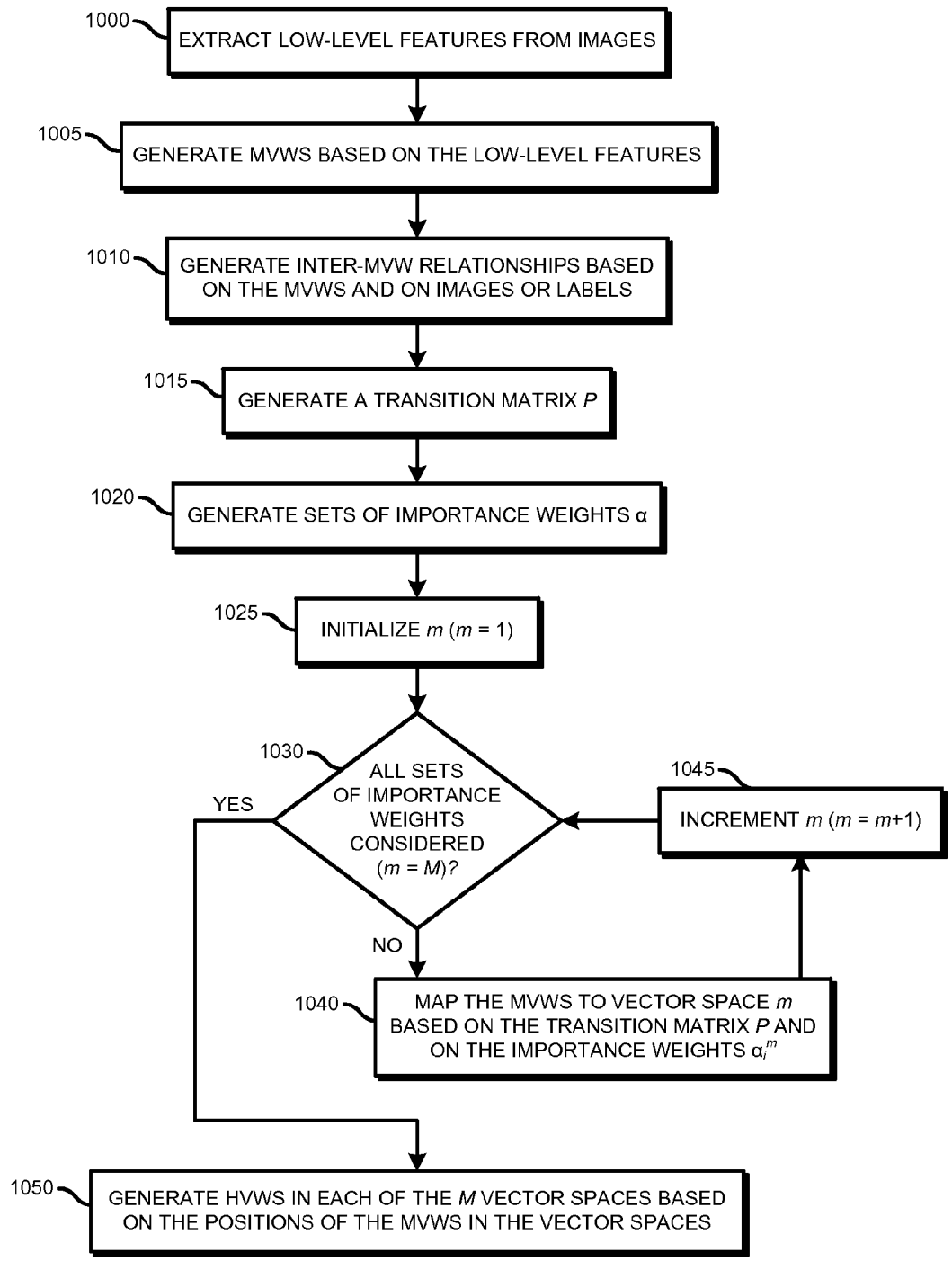
FIG. 10 illustrates an example embodiment of a method for generating high-level visual words.

FIG. 10 illustrates an example embodiment of a method for generating high-level visual words. The flow starts in block 1000, where low-level features are extracted from images. For example, some embodiments extract low-level features X. The flow then moves to block 1005, where MVWs are generated based on the low-level features. For example, some embodiments quantize low-level features X into mid-level features F with size N using k-means clustering. Next, in block 1010, inter-MVW relationships are generated based on the MVWs and maybe on the images or labels that are associated with the images. For example, some embodiments generate a similarity matrix S according to equations (1), (2), and (3). Following, in block 1015, a transition matrix P is generated based on the inter-MVW relationships. For example, some embodiments normalize the similarity matrix S such that its rows add up to 1 according to equation (5). The flow then moves to block 1020, where M sets of importance weights $\{\alpha_i^1, \alpha_i^2, \ldots, \alpha_i^M\}$ are generated. Next, in block 1025, a counter m is initialized to 1.

The flow proceeds to block 1030, where it is determined if all sets of importance weights $\{\alpha_i^1, \alpha_i^2, \ldots, \alpha_i^M\}$ have been considered, which is yes if m=M. If not (block 1030=no), then flow proceeds to block 1040, where the MVWs are mapped to vector space m based on the transition matrix P and the respective importance weights $\alpha_m$. For example, some embodiments calculate the low-dimensional vector-space coordinates for each MVW by optimizing equation (7) using gradient descent. Also, some embodiments perform the operations in blocks 640-660 in FIG. 6. Flow then moves to block 1045, where m is incremented (m=m+1), and then the flow returns to block 1030.

If in block 1030 all sets of importance weights $\{\alpha_i^1, \alpha_i^2, \ldots, \alpha_i^M\}$ have been considered (block 1030=yes), then flow proceeds to block 1050, where HVWs are generated in each of the M vector spaces based on the positions of the MVWs in the vector spaces. For example, some embodiments cluster the MVWs in each low-dimensional vector space separately from the other vector spaces, choose the K clusters with high importance scores from all of the vector spaces as HVWs, and save the grouping indexes for mapping from MVWs to the K HVWs. Additionally, some embodiments save the importance scores for the K HVWs, possibly for later use as a feature-significance measurement.

One embodiment was tested on a subset of the ImageNet dataset. The subset had 100 object labels and each label had approximately 1000 examples for training and 100 examples for testing. The training set was used to learn the HVWs and their corresponding classifiers. For the color-SIFT features, the test used SIFT interesting-point detection and extracted the features around the interesting points based on three channels. Next, the MVWs were generated using k-means clustering with K=3000. Then a similarity matrix S and a transition matrix P were generated according to inter-MVW relationships. Next, the coordinates of each MVW in each vector space were calculated. The total number of vector spaces, M, was 50. Also, the MVWs in each vector space were clustered to form HVWs and, for each vector space, the top 20 HVWs were selected according to their importance scores. Thus, the total number of HVWs was 1000. Finally, each image was represented using the HVWs, and classifiers were trained on the HVWs.

The results were compared with the results of three other methods: the traditional bag-of-word method (BOW), a PMI method, and a statistical diffusion mapping method that used soft assignment. The BOW method also used color-SIFT for the low-level features and used k-means to learn a codebook with size of 1000. A k-nearest-neighbors classifier was used as the classifier with cosine similarity for all methods. The error rates are shown in table 1.

TABLE 1

Recognition error results.

| | BOW method | PMI Method | SDM with soft assignment | Tested embodiment |
|---|---|---|---|---|
| First 5 categories | 0.47 | 0.455 | 0.389 | 0.392 |
| 100 categories | 0.79 | 0.772 | 0.731 | 0.716 |

Figure 11:
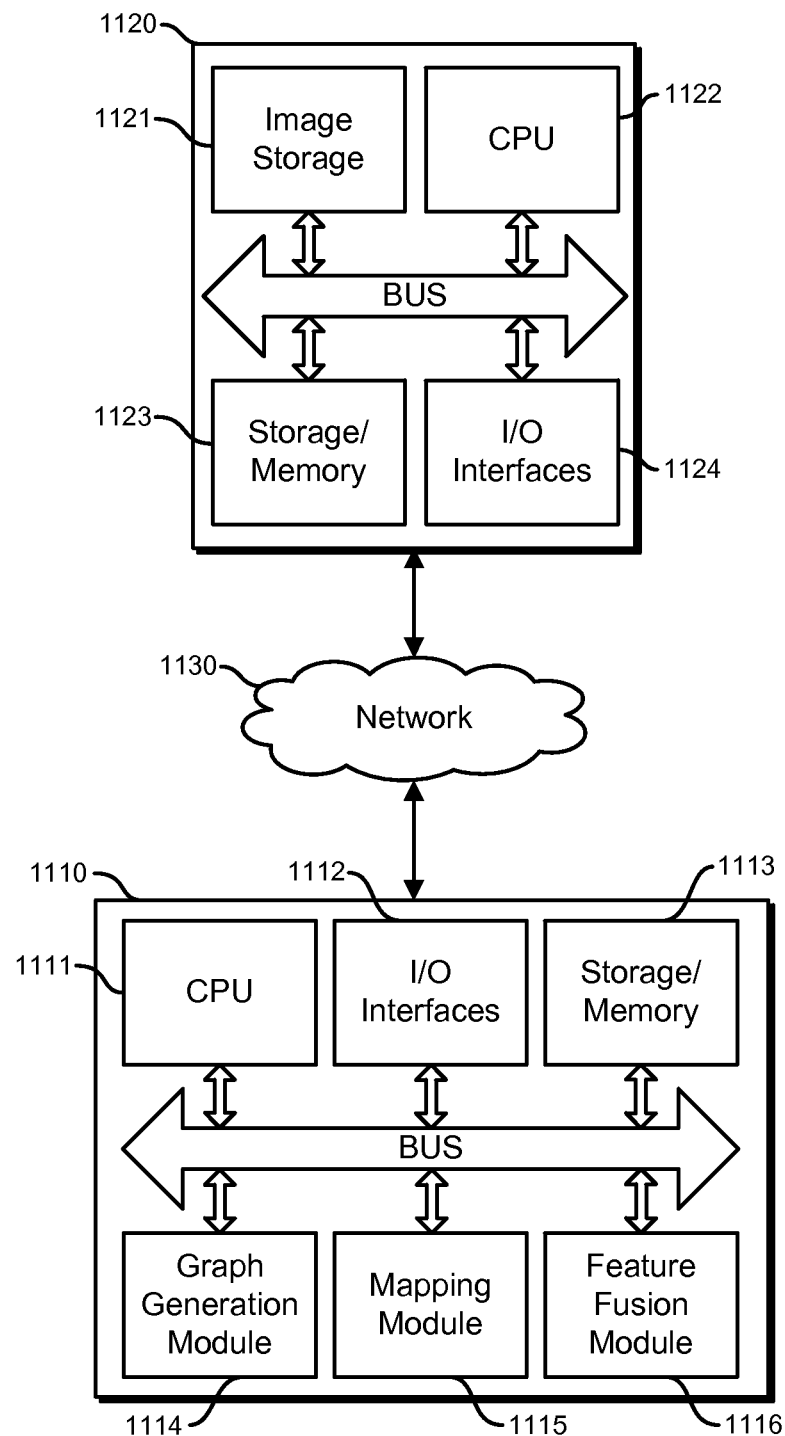
FIG. 11 illustrates an example embodiment of a system for generating high-level visual words.

FIG. 11 illustrates an example embodiment of a system for generating high-level visual words. The system includes a feature-fusion device 1110 and an image-storage device 1120. The feature-fusion device 1110 includes one or more processors (CPU) 1111, I/O interfaces 1112, and storage/memory 1113. The CPU 1111 includes one or more central processing units (e.g., microprocessors, single core processors, multi-core processors) and is configured to read and perform computer-executable instructions, such as instructions stored in the modules. The computer-executable instructions may include those for the performance of the methods described herein. The I/O interfaces 1112 provide communication interfaces to input and output devices, which may include a keyboard, a display, a mouse, a printing device, a touch screen, a light pen, an optical storage device, a scanner, a microphone, a camera, a drive, and a network (either wired or wireless).

The storage/memory 1113 includes one or more computer readable or writable media, and may include, for example, a magnetic disk (e.g., a floppy disk, a hard disk), an optical disc (e.g., a CD, a DVD, a Blu-ray), a magneto-optical disk, a magnetic tape, semiconductor memory (e.g., a non-volatile memory card, flash memory, a solid state drive, SRAM, DRAM), an EPROM, an EEPROM, etc. The storage/memory 1113 is configured to store computer-readable information or computer-executable instructions. The components of the feature-fusion device 1110 communicate via a bus.

The feature fusion device 1110 also includes a graph-generation module 1114, a mapping module 1115, and a feature-fusion module 1116. In some embodiments, the feature fusion device 1110 includes additional or fewer modules, the modules are combined into fewer modules, or the modules are divided into more modules. The graph-generation module 1114 includes instructions that, when executed by the feature-fusion device 1110, cause the feature-fusion device 1110 to receive one or more images (e.g., from the image-storage device 1120), extract low-level features from the one or more images, generate MVWs based on the low-level features, and generate a graph or other relationship representation (e.g., a similarity matrix) based on one or more of the following: the MVWs, the images, any labels, and other objects. The mapping module 1115 includes instructions that, when executed by the feature-fusion device 1110, cause the feature-fusion device 1110 to map the MVWs to multiple vector spaces (e.g., distinct vector spaces) based on a relationship representation (e.g., graph) and on sets of MVW importance weights. The feature-fusion module 1116 includes instructions that, when executed by the feature-fusion device 1110, cause the feature-fusion device 1110 to generate HVWs in the vector spaces, train one or more respective classifiers for the HVWs, and assign importance scores to the HVWs. The feature-fusion device 1110 stores generated MVWs, importance weights, relationship representations, HVWs, and importance scores in the storage/memory 1113.

The image-storage device 1120 includes a CPU 1122, storage/memory 1123, I/O interfaces 1124, and image storage 1121. The image storage 1121 includes one or more computer-readable media that are configured to store images or image features. The image-storage device 1120 and the feature-fusion device 1110 communicate via a network 1130.

Figure 12A:
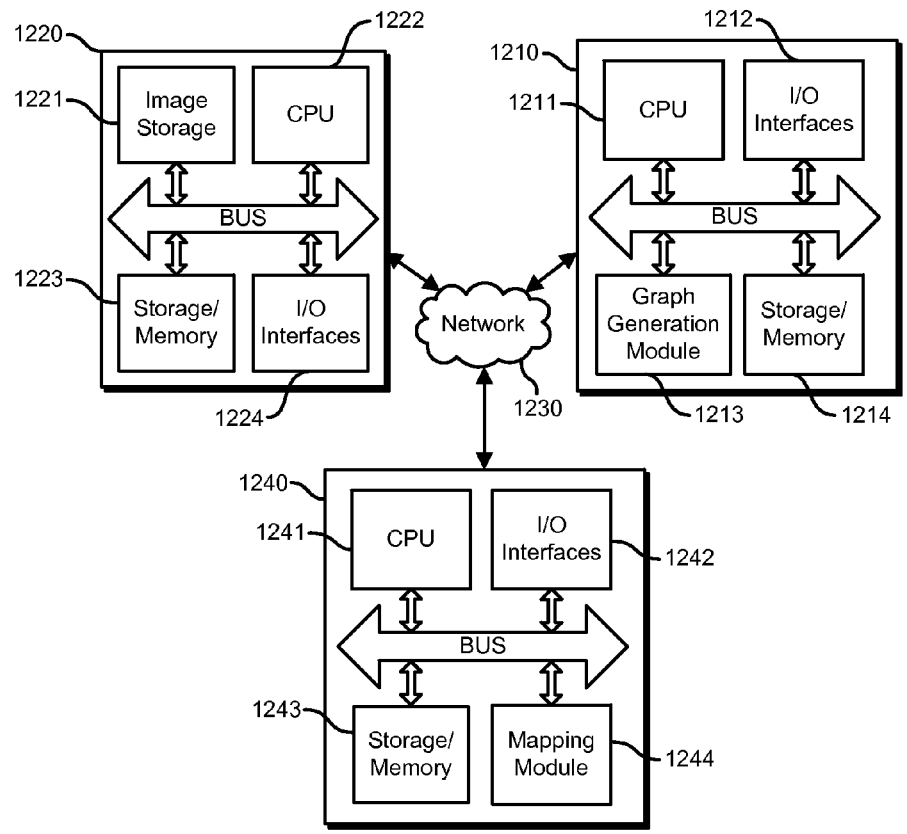
FIG. 12A illustrates an example embodiment of a system for generating high-level visual words.

FIG. 12A illustrates an example embodiment a system for generating high-level visual words. The system includes an image-storage device 1220, a relationship-modeling device 1210, and a mapping device 1240, which communicate via a network 1230. The image-storage device 1220 includes one or more CPUs 1222, I/O interfaces 1224, storage/memory 1223, and image storage 1221. The relationship-modeling device 1210 includes one or more CPUs 1211, I/O interfaces 1212, storage/memory 1214, and a graph-generation module 1213. The mapping device includes one or more CPUs 1241, I/O interfaces 1242, storage/memory 1243, and a mapping module 1244, which also includes the instructions in the feature fusion module 1116 of FIG. 11.

Figure 12B:
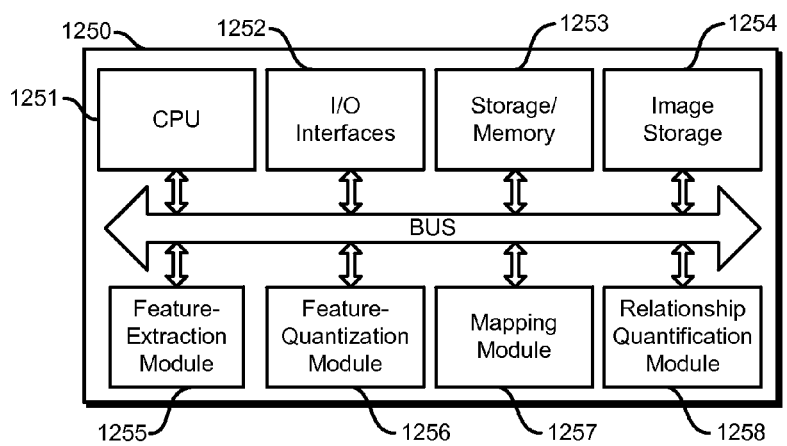
FIG. 12B illustrates an example embodiment of a system for generating high-level visual words.

FIG. 12B illustrates an example embodiment a system for generating high-level visual words. The system includes a feature-fusion device 1250. The feature-fusion device 1250 includes one or more CPUs 1251, I/O interfaces 1252, storage/memory 1253, an image storage module 1254, a feature-extraction module 1255, a feature-quantization module 1256, a mapping module 1257, and a relationship-quantification module 1258. The feature-extraction module 1255 includes instructions for extracting low-level features from images. The quantization module 1256 includes instructions for quantizing low-level features to generate MVWs. The relationship-quantification module 1258 includes instructions for quantifying the relationships of MVWs in the vector spaces and for generating and selecting HVWs in the vector space.

The above described devices, systems, and methods can be implemented by supplying one or more computer-readable media having stored thereon computer-executable instructions for realizing the above described operations to one or more computing devices that are configured to read the computer-executable instructions and execute them. In this case, the systems or devices perform the operations of the above-described embodiments when executing the computer-executable instructions. Also, an operating system on the one or more systems or devices may implement the operations of the above described embodiments. Thus, the computer-executable instructions and/or the one or more computer-readable media storing the computer-executable instructions thereon constitute an embodiment.

Any applicable computer-readable medium (e.g., a magnetic disk (including a floppy disk, a hard disk), an optical disc (including a CD, a DVD, a Blu-ray disc), a magneto-optical disk, a magnetic tape, and a solid state memory (including flash memory, DRAM, SRAM, a solid state drive)) can be employed as a computer-readable medium for the computer-executable instructions. The computer-executable instructions may be written to a computer-readable medium provided on a function-extension board inserted into the device or on a function-extension unit connected to the device, and a CPU provided on the function-extension board or unit may implement the operations of the above-described embodiments.

The scope of the claims is not limited to the above-described embodiments and includes various modifications and equivalent arrangements. Also, as used herein, the conjunction "or" generally refers to an inclusive "or," though "or" may refer to an exclusive "or" if expressly indicated or if the context indicates that the "or" must be an exclusive "or."

What is claimed is:

1. A method comprising: generating inter-visual-word relationships between a plurality of visual words based on visual word-label relationships, wherein the visual word-label relationships are based on co-occurrences of respective visual words and labels in one or more images, and wherein the inter-visual word relationships are based on scores between the visual word-label relationships of respective visual words; mapping the visual words to a vector space based on the inter-visual-word relationships; and generating high-level visual words in the vector space.

2. The method of claim 1, wherein respective distances between the visual words in the vector space indicate the inter-visual-word relationships.

3. The method of claim 1, wherein the inter-visual-word relationships are further based on visual word-image relationships and label-image relationships.

4. The method of claim 3, wherein the label-image relationships are one-to-one relationships.

5. The method of claim 1, wherein the scores between the visual word-label relationships of respective visual words are based on respective averages of the KL divergence between each pair of mid-level features according to $$S(F_i, F_j) = S(F_j, F_i) = \tfrac{1}{2}[KL(P_i|P_j) + KL(P_j|P_i)],$$

where $$KL(P_i\|P_j) = \sum_{q \in N} p(i, q) \log \frac{p(i, q)}{p(j, q)},$$

where $$p(i, q) \propto p(i | q) = \frac{f(i, q)}{\sum_j f(j, q)},$$

where p(i, q) denotes the joint probability that visual word $F_i$ appears in label q, and where f(i, q) indicates the frequency with which visual word $F_i$ appears in label q.

6. The method of claim 1, further comprising generating clusters of visual words in the vector space based on respective positions of the visual words in the vector space, wherein the high-level visual words are generated based on the clusters of visual words.

7. The method of claim 1, wherein the vector space is generated via a diffusion map.

8. One or more non-transitory computer-readable media storing instructions that, when executed by one or more computing devices, cause the one or more computing devices to perform operations comprising: generating inter-visual-word relationships between a plurality of visual words based on visual word-label relationships, wherein the visual word-label relationships are based on co-occurrences of respective visual words and labels in one or more images, and wherein the inter-visual word relationships are based on scores between the visual word-label relationships of respective visual words; mapping the visual words to a vector space based on the inter-visual-word relationships; and generating high-level visual words in the vector space based on respective positions of the visual words in the vector space.

9. The one or more computer-readable media of claim 8, wherein the inter-visual-word relationships are represented as distances between the respective visual words in the vector space.

10. The one or more computer-readable media of claim 8, wherein mapping the visual words to the vector space includes generating a weight matrix.

11. The one or more computer-readable media of claim 8, wherein the high-level visual words encode features via soft cluster assignments.

12. A method comprising: generating inter-visual-word relationships between a plurality of visual words; generating sets of importance weights for the visual words, wherein a set of importance weights includes a respective weight for each of the visual words; mapping the visual words to one or more vector spaces based on the inter-visual word relationships and on the sets of importance weights, wherein each vector space corresponds to a respective one of the sets of importance weights; generating high-level visual words in the plurality of vector spaces; assigning a respective importance score to each of the high-level visual words; and selecting high-level visual words based on their respective importance scores.

13. A system comprising: one or more computer-readable media; and one or more processors that are coupled to the one or more computer-readable media and that are configured to cause the system to generate inter-visual-word relationships between a plurality of visual words based on visual word-label relationships, wherein the visual word-label relationships are based on co-occurrences of respective visual words and labels in one or more images, and wherein the inter-visual word relationships are based on scores between the visual word-label relationships of respective visual words, map the visual words to a vector space based on the inter-visual-word relationships, and generate high-level visual words in the vector space.

* * * * *